United States Patent
Rahn et al.

(10) Patent No.: US 10,517,420 B2
(45) Date of Patent: Dec. 31, 2019

(54) ACCELERATED BREWING SYSTEM, METHOD, AND APPARATUS

(71) Applicant: BUNN-O-MATIC CORPORATION, Springfield, IL (US)

(72) Inventors: Christopher W. Rahn, Springfield, IL (US); David Trojahn, Springfield, IL (US); Brent Friedrich, Springfiled, IL (US); William Krause, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 288 days.

(21) Appl. No.: 15/289,064

(22) Filed: Oct. 7, 2016

(65) Prior Publication Data
US 2017/0099979 A1  Apr. 13, 2017

Related U.S. Application Data

(60) Provisional application No. 62/239,625, filed on Oct. 9, 2015.

(51) Int. Cl.
*A47J 31/32* (2006.01)
*A47J 31/44* (2006.01)

(52) U.S. Cl.
CPC .......... *A47J 31/32* (2013.01); *A47J 31/4407* (2013.01)

(58) Field of Classification Search
CPC .. A47J 31/3619; A47J 31/408; A47J 31/4421; A47J 31/103; A47J 31/306; A47J 31/4464; A47J 31/58; A47J 37/1219; A47J 37/128; A47J 2203/00; A47J 27/04; A47J 27/21008; A47J 31/3652; A47J 31/3657; A47J 31/401; A47J 31/41; A47J 31/4425; A47J 31/4457; A47J 41/0016; A47J 41/0033; A47J 2027/006; A47J 2027/008; A47J 27/0802; A47J 27/0815; A47J 27/122; A47J 27/14; A47J 27/18; A47J 31/00; A47J 31/02; A47J 31/0636; A47J 31/441; A47J 31/445; A47J 31/505; A47J 36/027; A47J 36/28; A47J 36/38; A47J 37/0713; A47J 37/1266; A47J 39/00; A47J 41/0011; A47J 41/0094; A47J 43/042; A47J 43/125; A47J 43/24; A47J 43/27; A47J 43/281; A47J 45/02; A47J 47/06; A47J 47/16
See application file for complete search history.

(56) References Cited

U.S. PATENT DOCUMENTS

| | | |
|---|---|---|
| 1,663,485 A | 3/1928 | Pierce |
| 3,046,869 A | 7/1962 | Reynolds |
| 3,085,495 A | 4/1963 | Axel |
| 3,349,690 A | 10/1967 | Heiner |

(Continued)

FOREIGN PATENT DOCUMENTS

| | | |
|---|---|---|
| AU | 1999017352 | 12/1999 |
| AU | 717016 | 3/2000 |

(Continued)

*Primary Examiner* — Hong T Yoo
(74) *Attorney, Agent, or Firm* — Barnes & Thornburg LLP

(57) ABSTRACT

According to the present disclosure, a brewing system includes a water delivery system, a cover, and a funnel. The water delivery system supplies water through a spray head of the cover to the funnel. The funnel holds brewing substance to be combined with the water to form a brewed beverage.

16 Claims, 6 Drawing Sheets

(56) References Cited

U.S. PATENT DOCUMENTS

| | | | |
|---|---|---|---|
| 3,450,024 A * | 6/1969 | Martin | A47J 31/057 99/295 |
| 3,451,329 A | 6/1969 | Herrera | |
| 3,478,671 A | 11/1969 | Fuqua et al. | |
| 3,478,672 A | 11/1969 | Fuqua | |
| 3,478,673 A | 11/1969 | Burney | |
| 3,478,675 A | 11/1969 | Wright | |
| 3,793,933 A | 2/1974 | Weber | |
| 3,844,206 A | 10/1974 | Weber | |
| 3,918,355 A | 11/1975 | Weber | |
| 4,143,589 A | 3/1979 | Weber | |
| 4,287,817 A | 9/1981 | Moskowitz et al. | |
| 4,426,919 A | 1/1984 | Rhoten et al. | |
| 4,612,850 A | 9/1986 | Kanazashi et al. | |
| 4,667,584 A | 5/1987 | Koyama et al. | |
| 4,949,632 A | 8/1990 | Camerini | |
| 5,255,593 A | 10/1993 | Bunn et al. | |
| 5,297,472 A | 3/1994 | Suzuki et al. | |
| 5,299,491 A | 4/1994 | Kawada | |
| 5,937,738 A | 8/1999 | Okamura et al. | |
| 5,964,143 A | 10/1999 | Driscoll et al. | |
| 5,992,300 A | 11/1999 | Fukushima | |
| 6,079,317 A | 6/2000 | Fukushima et al. | |
| 6,148,717 A | 11/2000 | Lassota | |
| 6,405,637 B1 | 6/2002 | Cai | |
| 6,543,335 B1 | 4/2003 | Lassota | |
| 6,976,421 B2 | 12/2005 | Hansen et al. | |
| 7,717,026 B1 | 5/2010 | Lassota | |
| 8,286,547 B1 | 10/2012 | Lassota | |
| 8,322,271 B2 | 12/2012 | Glucksman et al. | |

FOREIGN PATENT DOCUMENTS

| | | |
|---|---|---|
| EP | 1267685 | 1/2003 |
| JP | H05-192245 | 8/1993 |
| JP | H07-104979 | 11/1995 |
| JP | H10-043054 | 2/1998 |
| JP | H10-043055 | 2/1998 |
| JP | 2002177147 | 6/2002 |
| JP | 2003010051 | 1/2003 |
| JP | 2003135278 | 5/2003 |
| WO | WO 2002/019875 | 3/2002 |
| WO | WO 2002/087399 | 11/2002 |

* cited by examiner

ACCELERATED BREWING SYSTEM, METHOD, AND APPARATUS

CROSS-REFERENCE TO RELATED PATENT APPLICATIONS

This patent application claims priority under 35 U.S.C. § 119(e) to U.S. Provisional Patent Application No. 62/239,625, filed Oct. 9, 2015. The disclosure set forth in the referenced application is incorporated herein by reference in its entirety.

BACKGROUND

A variety of beverage making devices have been developed which combine heated water with a beverage making substance such as coffee or tea to produce a resultant beverage. Such beverage making equipment typically includes some kind of funnel, basket, or other device for containing the beverage brewing substance positioned on a brewer housing to retain the funnel proximate to a water delivery system for receiving water therefrom. The beverage brewing substance is retained within the funnel in a porous or foraminous filter such as a metal or plastic "permanent" filter formed of mesh or other porous materials as well as paper, cloth or other porous fabric-like structures. Water is introduced into the brewer where it is heated or it displaces previously heated water to dispense the water into the brewing funnel. Combination of the water and the beverage brewing substance cause an extraction of solids, flavors, oils and other materials from the coffee. As the water filters through, combines with, and causes extraction of the coffee, a liquid coffee beverage is dispensed through the funnel. The funnel is provided with at least one drain hole generally in the bottom of the funnel for dispensing the coffee into a cup, carafe, or other receiving container positioned below the funnel.

Typically these brewers rely upon the flow of gravity from the point at which water is dispensed into the coffee. Once the water combines with the ground coffee gravity provides the driving force for the flow of coffee during the extraction process of the brew cycle. Since a drain hole is provided in the bottom of the funnel, the brewed coffee will drain through the filter material, collecting in a bottom portion of the funnel defining a cavity below the filter material and then draining through the open drain hole. Once again, this process is typically driven by the delivery of water to the coffee and then gravity causing movement of water through the ground coffee and the movement of brewed beverage from the funnel through the drain hole. One of the results of this brewing process is that it requires time to combine the water with the ground coffee, extract the beverage from the ground coffee, and then dispense the brewed beverage from the funnel into the collection container.

SUMMARY

According to the present disclosure, a brewing system includes a water delivery system, a cover, and a funnel. The water delivery system supplies water through a spray head of the cover to the funnel. The funnel holds brewing substance to be combined with the water to form a brewed beverage.

In illustrative embodiments, the brewing system also includes a pressurization system and a seal member coupled to the cover. The seal member controllably engages with the funnel to seal a cavity of the funnel for pressurization. The pressurization system pressurizes the cavity during a brew cycle of the brewing system.

DETAILED DESCRIPTION

Figure 1:
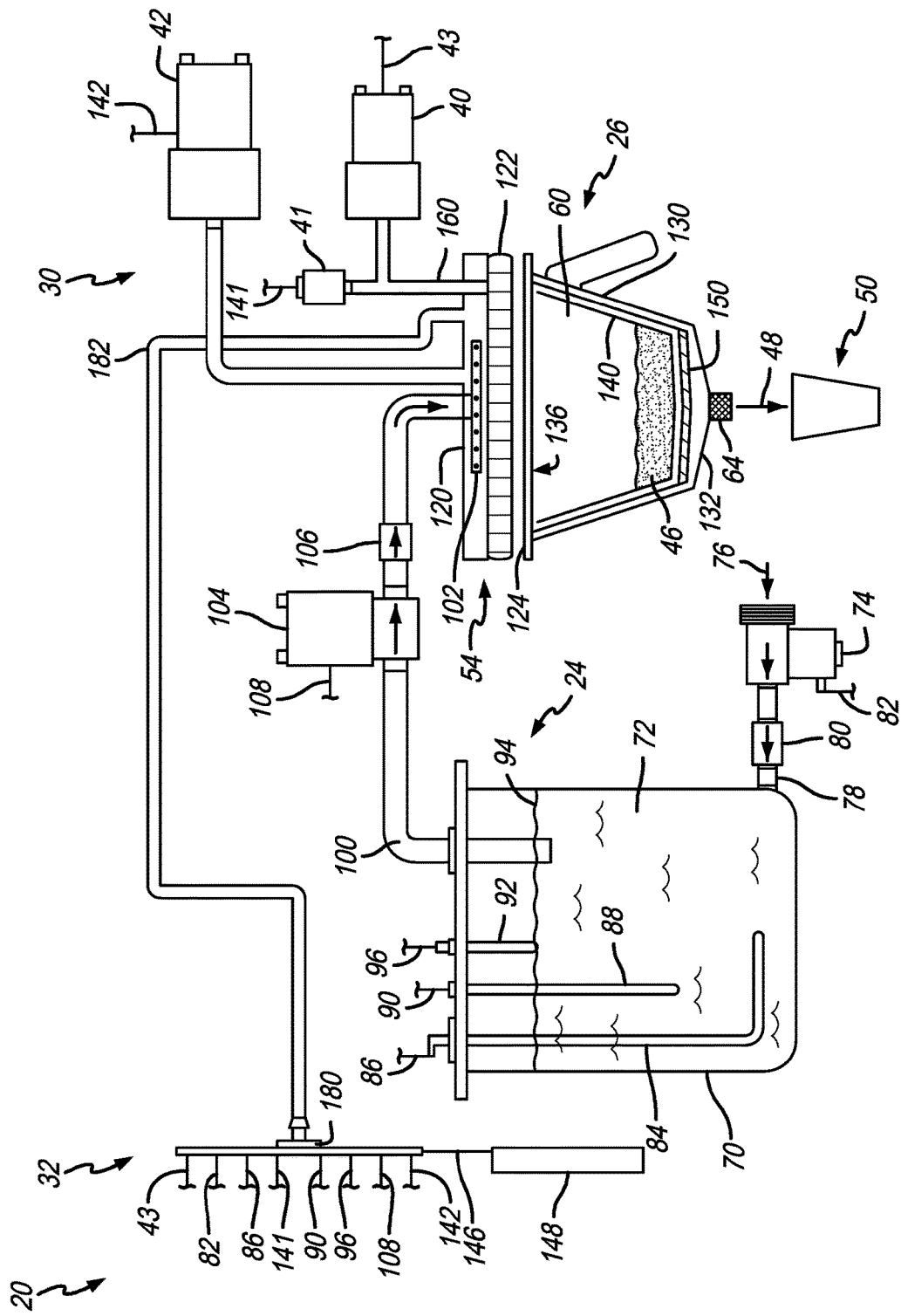
FIG. 1 is a general diagrammatic illustration of one embodiment of a brewing system in accordance with the present disclosure showing that the brewing system includes a non-pressurized water tank which controllably delivers water to a brew funnel for combination with ground coffee retained in the funnel, an inflatable seal member for engagement with the funnel so as to form a seal with the funnel, and a funnel blowout pump to provide pressurization to the internal cavity of the brew funnel, and suggesting that the seal member is movable between an inflated state to engage with and seal against the funnel and a deflated state spaced apart from the funnel.

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. In addition, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to including, but is not limited to beverage substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product.

Beverage ingredients will be described in the present application and will be generally referred to as "coffee". However, it will be understood that the term beverage ingredient should be broadly interpreted regardless of reference to beverage ingredient or coffee. In addition, the characteristics or form of the beverage ingredient can be any variety of ingredients, which are currently known or hereafter developed. The form of the beverage ingredient may include powder, liquid, gel, crystal, flake, freeze-dried and any other form or state regardless of temperature, phase, or other characteristics. Reference to beverage dispensing includes reconstituting, brewing, steeping, or any other form of combining a dilution ingredient with a beverage ingredient.

Moreover, while "beverage" is referred to, it is envisioned that any variety of food ingredients could be placed in an ingredient container to reconstitute a desired food. In this regard, the food could take the form of juice, coffee, tea, other flavored beverages, as well as other foods. Furthermore, use of a dilution ingredient is to be broadly interpreted. While "water" is referred to for convenience throughout the application it should be understood that any variety of dilution ingredients could be used with the present application.

The foregoing terms as well as other terms should be broadly interpreted throughout this application to include all known as well as all hereafter discovered versions, equivalents, variations, and other forms of the abovementioned terms as well as other terms. The present disclosure is intended to be broadly interpreted and not limited.

With reference to FIG. 1, a brewing system 20 is illustrated. The brewing system 20 includes a cover 54, a funnel 26, and a pressurization system 30. The funnel 26 is configured to hold a brewing substance 46, such as ground coffee, and allow heated water delivered by a water delivery system 24 through the cover 54 to flow through the brewing substance 46 and form a brewed beverage. The pressurization system 30 includes a controllable pump 40, used to inflate a seal member 122 of the cover 54 to seal the funnel 26, and a blowout pump 42 used to pressurize an internal cavity 60 of the funnel 26 during a brewing cycle. A control system 32 is coupled to the various sub-systems and components of the brewing system 20 for monitoring and controlling these systems.

In the illustrative embodiment, the brewing system 20 is configured to be received in a housing (not shown) to form a brewer unit. The funnel 26 is configured to be mounted on the housing below the cover 54, as suggested in FIG. 1, during a brew cycle. The funnel 26 is dismounted after the brew cycle to replace the spent brewing substance for a subsequent brew cycle.

The brewing system 20 facilitates the controlled dispensing of water to the brewing substance 46 to produce a brewed beverage 48, such as a coffee extract, for dispensing into a cup, carafe, or other retaining container 50. Under some circumstances it is desirable to accelerate this process while maintaining or improving the desirable resultant beverage characteristics. The limiting factor on the brewing time includes the interaction between the water and the brewing substance, the characteristics of the funnel, and the required time for the beverage extract to flow from the combination of coffee and water or slurry under the natural forces of gravity. Acceleration of the brewing process also allows brewed beverage to be produced more quickly, such as in a busy restaurant environment, than is currently available given current gravity extraction methods. Blowout pump 42 of pressurization system 30 provides controllable pressurization the internal cavity 60 of funnel 26 where the brewing substance 46 and water mix together to facilitate pressurized movement of brewed beverage 48 out through a drain hole 64 of the funnel 26.

The water delivery system 24 includes a heated water or brew tank 70 and a brew water pump 104 as shown in FIG. 1. The brew tank 70 contains heated water 72 for use in dispensing to the funnel 26. The tank 70 is filled by means of an inlet water valve 74 that controllably introduces water from a pressurized water source 76 through a line 78. A check valve 80 is provided on the line 78 to prevent back flow. The controllable inlet water valve 74 is coupled to the control system 32 over line 82. Water is introduced into the brew tank 70 and heated by a tank heater 84 that is coupled to the control system 32 over line 86. A temperature probe 88 is positioned in the water 72 in the tank 70 for detecting the temperature of the water 72 in the tank 70. The temperature probe 88 is connected to the control system 32 over line 90. A level probe 92 extends into the tank to detect a water level 94 of water 72 and is coupled to the control system 32 over line 96. The level probe 92 detects the water level 94 and closes the inlet water valve 74 when a predetermined level or range of levels is detected.

An outlet line 100 communicates with the tank 70 to deliver water from the tank to a spray head 102 of the cover 54 as suggested in FIG. 1. The brew water pump 104 communicates with the line 100 to move water from the tank 70 through line 100 to the spray head 102. A check valve 106 is provided to prevent back flow. The brew water pump 104 is coupled to the control system 32 over line 108. Water controllably dispensed from the tank 70 through the outlet line 100 is delivered to the spray head 102 for dispensing to the brewing substance 46 retained within the funnel 26. A variety of configurations for the spray head 102, both currently known and hereafter developed, can be used in the brewing system 20, and so the spray head 102 is shown diagrammatically in FIG. 1. In some embodiments, the line connecting the funnel blow out pump 42 to the cover 54 is combined with that of the water delivery system 24 connecting the brew tank 70 to the spray head 102.

In the illustrative embodiment, cover 54 includes inflatable seal member 122 and spray head 102 coupled to an upper plate 120 as suggested in FIG. 1. The funnel 26 includes a carrier 130 and an insert 150 positioned in the carrier 130. A filter 140, such as a paper or "permanent" screen filter, is supported by the insert 150 to hold the brewing substance 46 inside a cavity 60 of the funnel 26. The insert 150 positions the filter 140 above a bottom wall 132 of the carrier 130.

Figure 3:
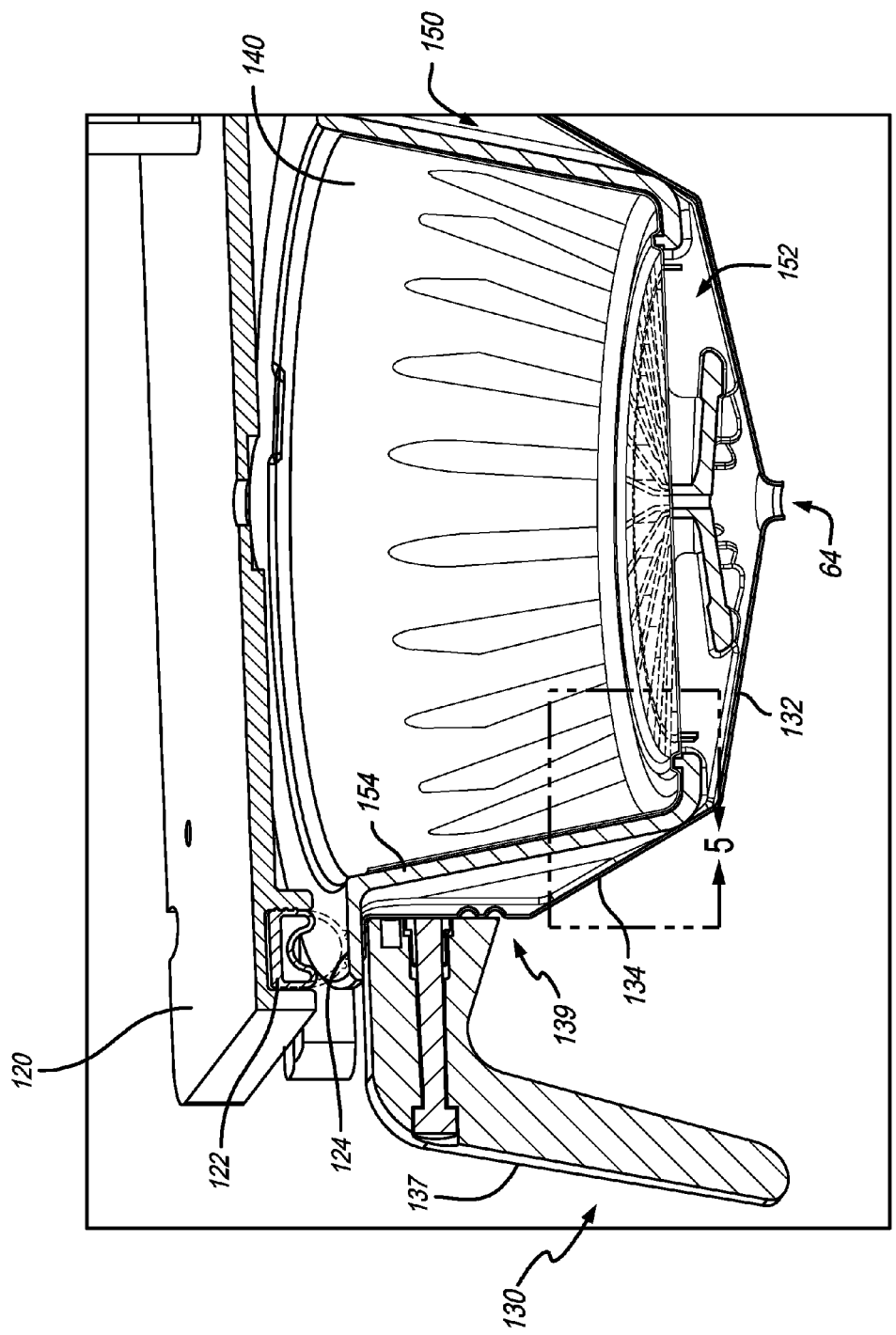
FIG. 3 is a partial sectional view of a funnel for use with the brewing systems of the present disclosure showing that the funnel includes a carrier and an insert received in the carrier, and suggesting that a filter engages with a support base of the insert to seal a lower perimeter edge of the filter and that the inflatable seal member engages with a rim of the insert to seal an internal cavity of the insert for pressurization.

With the funnel 26 mounted on the brewer housing, the inflatable seal member 122 of the cover 54 forms a seal with a flange 124 around an upper opening 136 of the funnel 26 as suggested in FIGS. 1 and 3. The opening 136 extends into the cavity 60 of the funnel 26 as suggested in FIG. 1. The cavity 60 can then be pressurized. In the illustrative embodiment, the drain 64 of the funnel 26 is always open, and the pressure in the cavity is created due to the mixture of brewing substance and water which impedes the flow of gases toward the drain 64. As such, pressure may build to a certain level but the outflow of brewed beverage 48 from the funnel 26 prevents continued, unlimited pressure build up.

In some embodiments, a display 148 is coupled to the brewer housing to allow a user to control the brewing system 20 as suggested in FIG. 1. The display 148 is coupled to the control system 32 over line 146. The display 148 can be mechanical, electro mechanical or another type of control such as a visual display with touch screen controls. The display 148 allows the operator of the brewer to select various features, brewing recipes, control or calibration features, as well as other controls and features of the brewing system 20.

One of the objectives of the present disclosure is to provide a brewing system 20 that is familiar to the operator. In other words while the system 20 is improved compared to other devices, it is done in a format and using structures and providing functions that are familiar and intuitive to the average operator. To this end, the configuration of the brewing system 20 uses familiar structures such as a carrier receiving a paper filter to be mounted on the brewer housing by sliding into place below the cover 54 on rails of the brewer housing. The funnel 26 is intended to be sized and dimensioned and configured for engagement with a rail system that is familiar to the average user who has used a brewer. While improved structures and functions are disclosed herein, the overall general user experience and interface with the brewer is likewise intuitive allowing the operator to merely place a filter in the funnel 26, add brewing substance 46 onto the filter 140, attach the funnel 26 to the brewer housing, and start a brew cycle. In other words, the operator does not need to learn any new skills or technology in order to operate this improved brewing system 20.

In one illustrative embodiment of a brew cycle, a fresh filter 140 is added to the funnel 26 and brewing substance added thereon. The funnel 26 is mounted on the brewer housing below the cover 54. In some embodiments, a detent or lock is used to signal when the funnel 26 is fully and properly inserted. Once the funnel 26 has been mounted, and the system 20 is activated, either the inflatable seal member 122 can be inflated to engage the flange 124 or the water delivery system 24 can start delivering water to the spray head 102 without the seal member 122 being inflated.

Depending on the operator's preference or the desired configuration, the water can be introduced into the cavity 60 of the funnel 26 to pre-infuse the brewing substance 46 and allow it to bloom or out-gas. In the case of ground coffee, the pre-infusion allows for carbon dioxide to be emitted from the brewing substance. If the funnel 26 is sealed by inflation of the inflatable seal member 122, this gas will merely evolve from the brewing substance 46 and be distributed throughout the volume of the cavity 60. This might tend to create a slight pressurization but it generally will not be significant. If the inflatable seal member 122 is not yet inflated to engage the flange 124 the gas will be emitted from the area between the funnel 26 and the seal member 122.

Continuing with the brew cycle, if the seal member 122 has not been inflated, it is now inflated by the seal pump 40. The pump 40 is connected to one or more positions on the inflatable seal member 122 by one or more tubes 160. The tube 160 allows for the pressurization of the inflatable seal member 122 thereby expanding the seal member 122 and engaging the annular flange 124 around the opening 136 of the funnel 26. Once sealed, water can be dispensed from the water delivery system 24 through the spray head 102 in a controlled manner. The water can flow at a generally continuous rate or it can be increased or decreased by controllably dispensing doses or pulses of water. The controlled dispensing or pulsing can be used to control the volume of water in the cavity 60 of the funnel at any given moment. A funnel seal pressure regulator 41 allows deflation of the seal by venting pressure from inside the seal member 122. It should be noted that the inflation of the inflatable seal member 122 also acts to prevent the removal of the funnel 26 during the brewing process. In other words, the inflatable seal member 122 provides a forceful engagement with the corresponding flange 124 on the funnel 26 to act as a detent or lock to retain the funnel 26 in position during the brewing process. When the seal member 122 is inflated against the flange, it tends to capture the flange in the funnel rails and prevent it from being prematurely removed during the brewing process. This can be beneficial so that the funnel can remain in this retained position throughout the brewing cycle and only disengaged at the end of a brew cycle once a particular parameter or range of parameters is detected indicating that it is acceptable to disengage the seal member 122 from the funnel 26. A separate lock can also be provided to accomplish this same goal.

As will be described in more detail below, a preferred version of the seal member 122 is provided in a configuration to facilitate automatic retraction of the seal member away from the funnel 26 upon removal of the pressurizing force within the seal member. In other words, the seal member 122 is positioned away from the flange 124 when it is not pressurized. This allows for mounting of the funnel 26 on the brewer housing in a familiar and unimpeded manner. Once again, this facilitates the familiar and convenient use of the brewer in a. In addition, this reduces the wear and tear on the seal member 122 material which, if it did not retract away from the flange, may be gradually worn over time by scraping and friction caused when the funnel is engaged or disengaged relative to the seal member. It should be noted that a variety of geometric shapes and configurations for funnel 26 and inflatable seal member 122 can be used. While a self-retracting seal member is described in the illustrative embodiment, it is envisioned that a non-self-retracting seal member could be used. As such, the seal member is intended to be broadly defined within this disclosure.

The funnel 26 is configured to hold controlled volumes of water added to the brewing substance, and brewed beverage 48 is extracted under influence of the pressurization provided by the funnel blow out pump 42 to the cavity 60. The pump 42 enhances the flow of water through the brewing substance 46 by pressing the water into the cells of the particles of brewing substance 46. This may tend to increase the saturation and extraction of desirable characteristics from the particles of the brewing substance 46. In other words, this may tend to extract more solubles, flavor characteristics, essential oils and other chemical and physical components of the coffee that can contribute to a desirable beverage. Provided with the components, controls, and features of the disclosed brewing system 20, a variety of recipes can be configured using these control systems to allow for the controlled extraction of new and desirable recipes. As might be expected, these controls can be configured for a variety of types of brewing substance, such as different types of coffee, roasts of coffee, as well as other identifying features or characteristics of the coffee, or any other being substance used in this brewing system 20.

One embodiment of the present disclosure provides for the controlled dispensing of smaller volumes of water from the water delivery system 24 during the brewing cycle totaling the full predetermined volume of water needed for the entire brewed beverage volume. While the pump 42 generally maintains a relatively consistent gas pressure on the system, this pump 42 may also be controlled to increase or reduce the pressure in the cavity 60. This can accelerate or decelerate the production and dispensing of brewed beverage 48 from the funnel 26 during the brew cycle. A pressure transducer 180 is coupled to the control system 32 and communicates with the pressurized area during a brew cycle over line 182. The pressure transducer is used to sense and detect the pressure in the cavity 60 to provide feedback as to the pressurization. As such, the pressure transducer monitors the pressure in the cavity and communicates that signal to the control system. If the control system detects that signal or measurement is outside of an acceptable predetermined range it can then operate to direct the control system to reduce the pressurization by the pump 42. This is yet another control feature that can be used to control the brew cycle, level of extraction of brewing substance, as well as related operating parameters. The pressure transducer is used to monitor and control the creation of a pressure differential within the funnel 26 during the brew cycle. This pressure differential is important to this system 20 because it accelerates the brew cycle (decreases the total time for the brew cycle), controls the total dissolved solids produced in the brewed beverage 48, as well as to allow customization of the brewing recipes associated with the brewing substance.

The control system 32, using information received from the pressure transducer 180, monitors the change in pressure within the cavity 60 to detect the end of each fill/press cycle as well as the end of the brew cycle. For example, when water is added to the funnel it will tend to increase the pressure within the cavity because some amount of additional material has been added to the funnel to occupy a portion of the total volume. This will be reflected as an increase of pressure by the pressure transducer. As the pump 42 provides gas pressure within the cavity 60 the pressure transducer 180 will detect an increased pressure within the cavity. If the pressure transducer detects a pressure that is in excess of a predetermined range it can slow down the pressurization from the pump or turn off the pump 42. The pressure transducer 180 can also provide information to the control system to detect a pressure differential based on the size of the particles of brewing substance either finer or courser, as well as accommodate for and adjust to the use of other types of brewing substances. For example, tea may require less pressure and more time to steep whereas decaf coffee might tend to require higher pressure in order to produce extraction within a desired time period.

The signal detected by the pressure transducer 180 and communicated to the control system 32 can also be used to detect when the system should be shut down due to some inappropriate operation of the system. For example, if somehow the drain 64 becomes clogged or otherwise blocked, the system will continue to increase in pressure beyond the upper level of a predetermined range. This increase in pressure will be detected by the pressure transducer 180. Such a signal will cause the control system 32 to cease operation of the system and disengage or terminate power to the pump 42 as well as, possibly the funnel seal pump 40. Under such circumstances the water delivery system 24 would also be stopped to prevent continued pumping of water using the pump 104. Under such circumstances such blockage would result in overflowing the funnel and creating an undesired mess of the system. However, due to the use of the pressure transducer detecting the pressurization of the cavity 60 such mess can be averted.

Additionally, at the end of a brew cycle and dispensing of a predetermined volume of water from the water delivery system 24 the operation of the water pump 104 will be terminated. At the termination of the water dispensing some volume of water will need to continue to infuse the brewing substance and flow through the bed of brewing substance 46 in the funnel 26. However, as the volume of water saturating the brewing substance is decreased the pressure will tend to decrease within the cavity 60. As a result, the pressure transducer will detect the change in pressure, which can then be used to terminate the pump 42 at an appropriate time. The control system 32 can be configured to operate for a predetermined period of time beyond exceeding a threshold limit at the transducer or operate until a predetermined level is attained at which point the pump 42 can be turned off. This set of operations can also be used as part of a sequence, which will terminate operation of the pump 40 to deflate or prevent continued inflation of the seal member 122. As previously noted, the seal member is of the type that is self-retracting and as such once the pressurization is removed from the seal member the seal member can retract. This series of events leads to the completion of the brew cycle or is provided at the completion of the brew cycle after which an operator can remove the funnel from the brewer housing.

The water pump 104 in the configuration as shown in FIG. 1 may be provided as a modulated controlled pump 104 to provide pulses of water. This allows for variable rates of input to the pump 104 and improves the degree of control and types of water dosing or pulse routines. Such control can also enhance the dispensing of water to create additional flow or agitation within the bed of brewing substance in the funnel 26. This can be used to enhance the turbulence and extraction associated with the operation of system 20. Such agitation may be used to control the extracting of the total dissolved solids (TDS). Such control can affect the flavor and other characteristics of the brewed beverage extracted from the brewing substance 46.

As noted above, the funnel 26 includes a carrier 130 and an insert 150 received in the carrier 130 as shown in FIG. 3. Carrier 130 includes a handle 137 and a shell 139 coupled to the handle 137. Shell 139 includes a sidewall 134 and a bottom wall 132. Bottom wall 132 is formed to include the drain opening 64. The insert 150 includes a support base 152, a sidewall 154 extending upward from the support base 152, and the flange 124 extending outward from the top of the sidewall 154.

Figure 4:
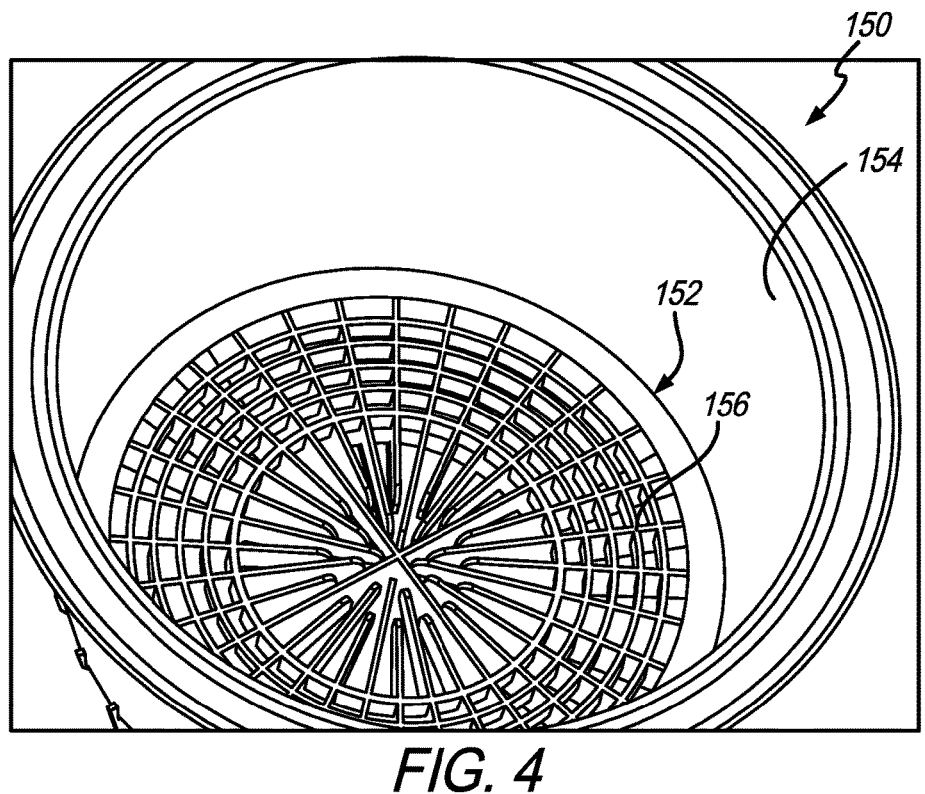
FIG. 4 is a top perspective view of the insert of FIG. 3 looking into the cavity of the insert showing that a support base of the insert is formed to include a foraminous pattern to support a filter positioned on the support base against the pressure within the cavity and allow brewed beverage to pass through the insert and out of the funnel.

Support base 152 is formed to include a patterned, foraminous floor 156, as shown in FIG. 4, which supports filter 140 and allows brewed beverage to pass through insert 150 and out of drain opening 64, as suggested in FIG. 3. The floor 156 is similar to a grate or otherwise open structure providing a series of generally radially extending ribs and circular ribs to provide a matrix of openings and support ribs. The floor 156 is constructed with a degree of "openness" or otherwise provided with openings or passages and preferably configured with 60-75% open areas. This facilitates flow of brewed beverage through the openings while providing sufficient support for a filter paper or other filter structure. If a significantly smaller percentage of area is presented it reduces the effectiveness of the draining of brewed beverage from the filter and out through the drain hole 64. If a significantly greater percentage is open it could result in the failure or rupture of the filter material. The increased open area provides less support for the filter material and as such could be ruptured or otherwise breached due, in part, to the increased pressure in the brewing cavity 60. As the increased pressure tends to create a greater driving force against the water retained within the slurry, it will create a pressure against the filter paper. If the filter paper is not properly supported it could tear or otherwise fail which could result in ruining the batch of brewed beverage due to the introduction of particles of brewing substance.

As noted the funnel 26 accommodates a standard filter paper. However, in one configuration the area of the base in the funnel might be slightly larger than a standard base configuration. While the operator generally will not detect the size variation, the increased size of the base allows for a greater flow of coffee through the base openings. This might be useful because virtually no brewed beverage drains from the filter paper along the sidewalls. In other words, the filter paper tends to be positioned against the inside surface of the funnel wall during the brewing process. No additional gaps are provided in the interior surface of the funnel wall and as such there is a little if any room for coffee to drain therethrough.

Figure 5:
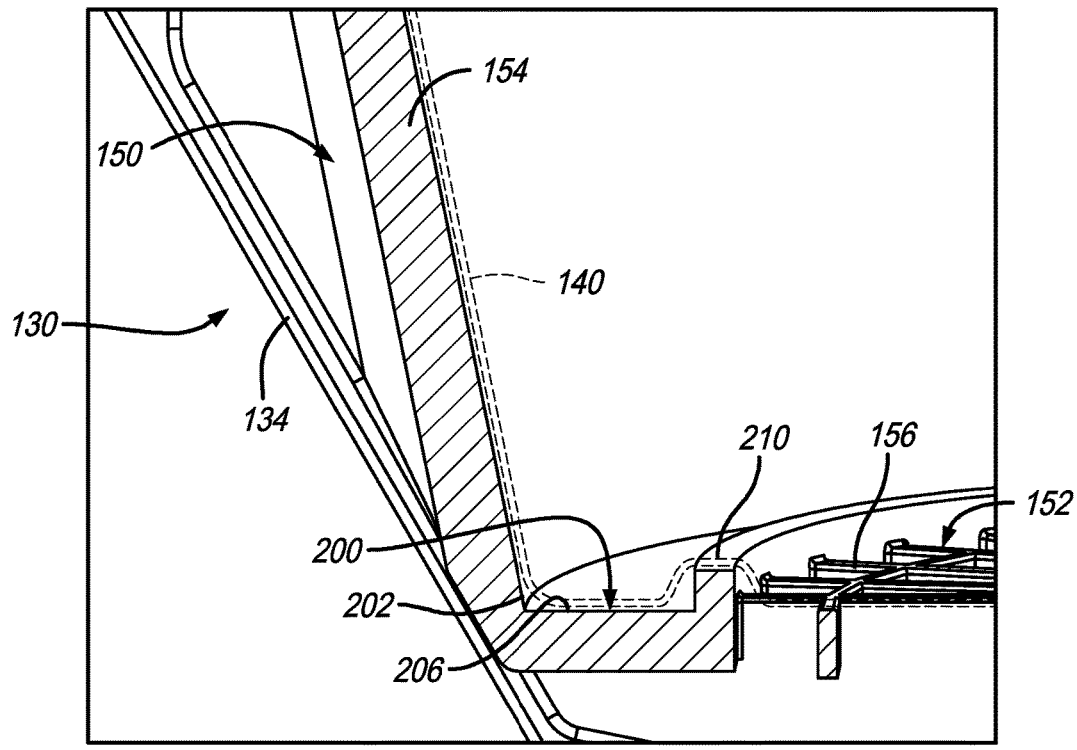
FIG. 5 is an enlarged view of the funnel of FIG. 3 showing that the insert is formed to define an annular trough to receive the filter suggesting that the pressurization in the funnel forces the filter against the trough to form a seal around a lower perimeter edge of the filter.

The flow of coffee through the walls is also impeded as a result of an annular trough 200 which is formed at a lower edge 202 of the sidewall 154 as seen in FIG. 5. The trough 200 is annular including a solid channel 206 and an annular curb 210 spaced apart from the sidewall 154. These structures define the trough 200. When filter material is placed in the cavity 60 and brewing substance 46 is placed therein it will not engage the trough to seal the filter material in the trough 200 in a dry condition. Rather, after the water is introduced some portion of water will accumulate in the trough 200. This water will saturate the filter material in that area and the brewing substance in that area. The saturation of these components tends to create a seal in the trough 200. This causes all of the water to flow through the bed of brewing substance 46 and out through the open areas of the floor 156 of the support base 152. This helps provide a generally even distribution of water throughout the entire bed for brewing substance 46 and passage through virtually the entire volume of brewing substance. This, which can also be combined with agitation, can enhance the extraction of the flavor characteristics from the brewing substance and improve the efficiency of the extraction. Not only does the brewing system 20 of the present disclosure increase the speed with which brewed beverage is extracted but it also tends to increase more of the desirable characteristics of the brewed beverage in less time. As a rough comparison, typical gravity extraction techniques might be 70% efficient. In contrast, the present system 20 might be more like 95%+efficient. This is due to the more thorough and uniform saturation of the bed of brewing substance as a result of the various features and functions as described herein.

As an additional matter, the trough 200 configuration tends to be very "forgiving" with regard to the placement and positioning of the filter paper 140 and brewing substance 46 within the funnel 26. In other words, if a portion of the filter paper is lower on the wall, because the trough tends to seal the filter paper and grounds in the trough it prevents the creep or movement of grounds through the back side of the filter paper and into the brewed coffee. This tends to provide a "self-leveling" feature or function of the brewing substance bed as well as the filter paper within the funnel. As an example, if the filter paper is misplaced or misshapen and/or the brewing substance is dispensed into the filter unevenly or to one side of the funnel the flow of water into the funnel and the pressurization of the cavity tends to level out the bed depth of the brewing substance as well as somewhat securely engage the filter paper in the trough thereby preventing unintended flow of brewing substance into the dispensed brewed beverage. This set of configurations and functions adds consistency to the quality of the brew and reduces the brew time by accelerating the brew cycle. This not only improves the coffee characteristics, and the efficiency of the extraction, but also requires less training for the operator. Since this system is very forgiving, it becomes more "fool proof" and less dependent upon human interaction with the system.

Figure 6:
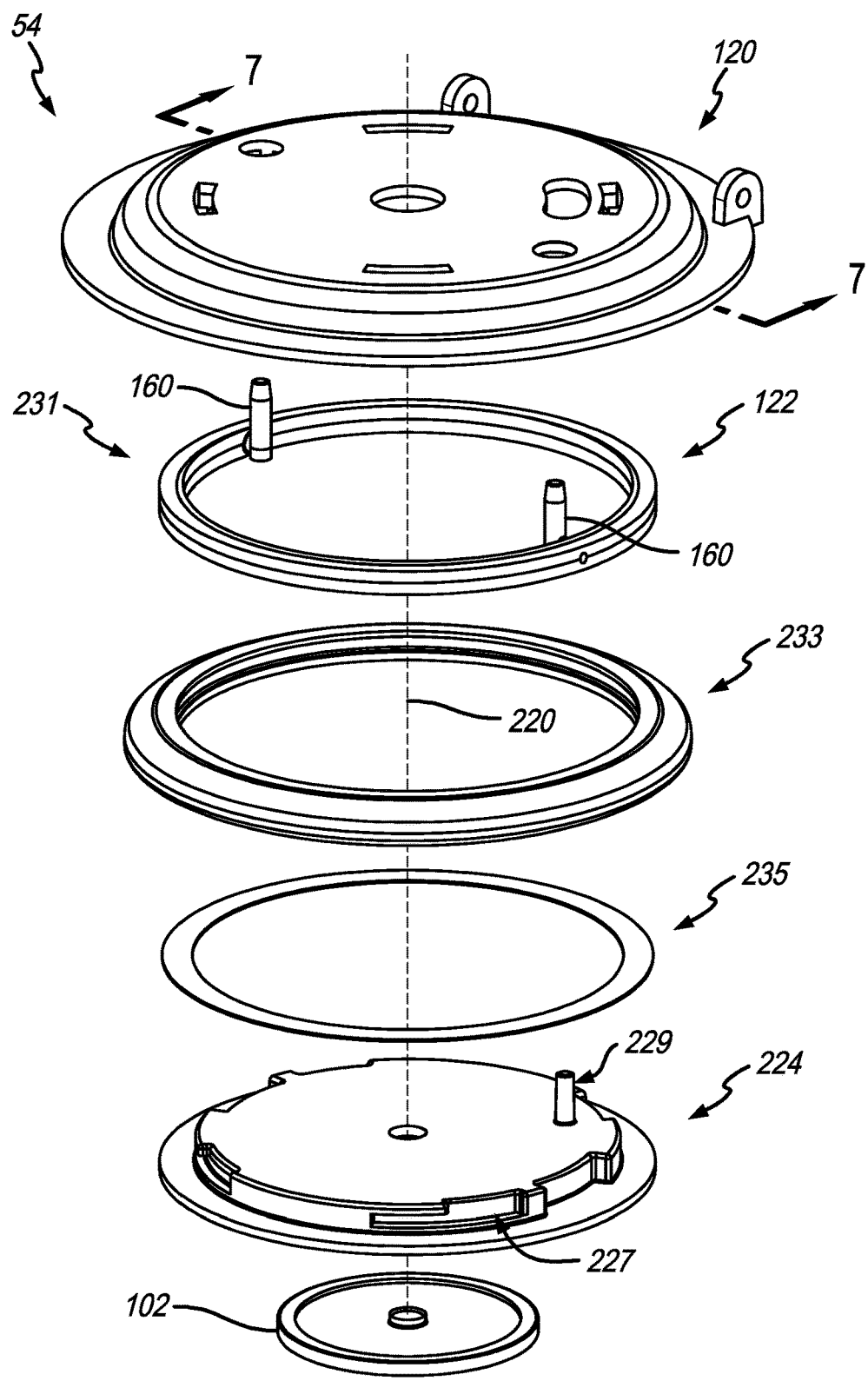
FIG. 6 is an exploded perspective view of one embodiment of a cover portion of the brewing systems of the present disclosure showing that the cover portion includes an upper receiver, a pump ring, an inflatable gasket, a lock plate, and a spray head, and suggesting that the lock plate engages with the receiver to hold the pump ring, inflatable gasket, and spray head on the receiver.
Figure 7:
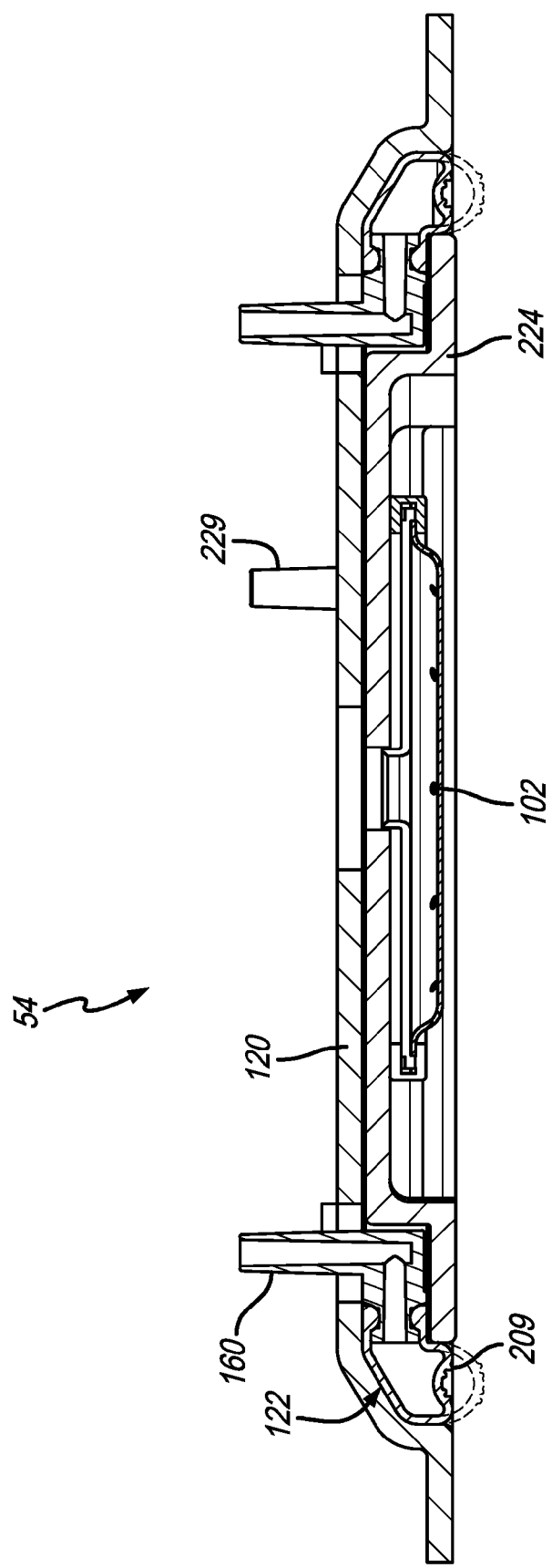
FIG. 7 is a sectional view taken along line 7-7 in FIG. 6 showing the inflatable gasket coupled to the pump ring and suggesting that the pressure is delivered to the gasket through the pump ring to inflate the gasket and that the head cooperates with the funnel to seal the cavity of the funnel and deliver water and pressure into the funnel.

One embodiment of cover 54 is shown in FIGS. 6 and 7. In the illustrative embodiment, a lock plate 224 engages with plate 120, sometimes called retainer 120, to hold seal member 122 on retainer 120. Seal member 122 includes a pump ring 231 and an inflatable gasket 233 coupled to pump ring 231. Tubes 160 are connected to pump 40 to send gas from pump 40 through pump ring 231 and into gasket 233. Lock plate 224 and retainer 120 clamp pump ring 231 and gasket 233 together. An optional seal ring 235 is positioned between lock plate 224 and seal member 122. Lock plate 224 includes a catch 227 to hold lock plate on retainer 120 and an inlet 229 coupled to pump 42 to pass pressurizing gas into funnel 26. Spray head is coupled to lock plate 224.

Figure 2:
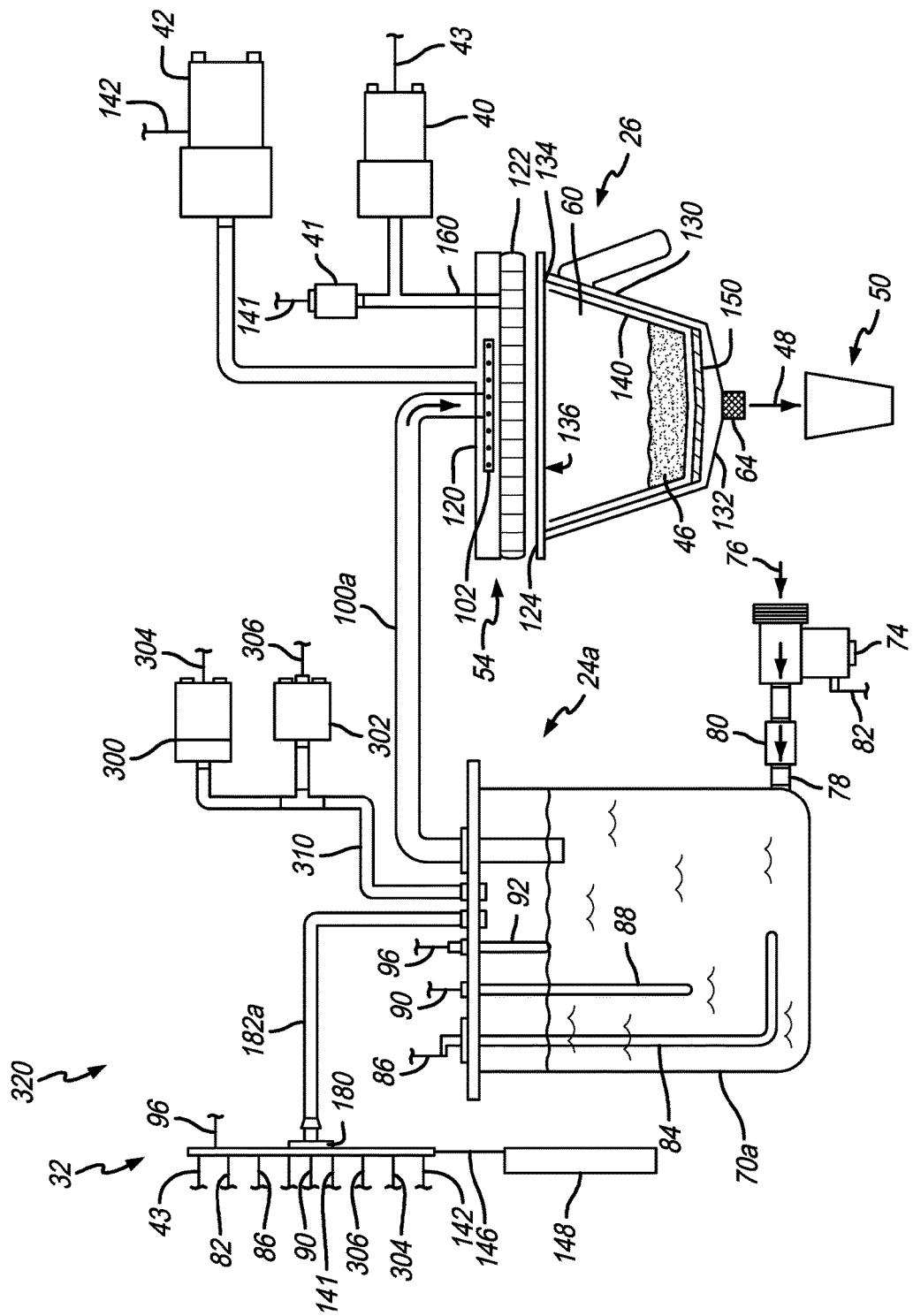
FIG. 2 is a general diagrammatic illustration of another embodiment of a brewing system in accordance with the present disclosure.

Another embodiment of a brewing system 320 is shown in FIG. 2. This diagrammatic illustration in FIG. 2 shows a system 320 that operates in much the same manner as the brewing system of FIG. 1. The difference is how the water delivery system 24a delivers pressurized water to the funnel 26. Instead of using a water pump 104 to draw and transport water from the tank 70 as shown in FIG. 1, a tank pressurization pump 300 and a controllable tank vent valve 302 are provided. The pump 300 and valve 302 are coupled to the control system 32 over lines 304 and 306, respectively. The pump 300 and valve 302 communicate with the tank 70a over line 310. During a brew cycle pressurization of the water is provided by the tank pump 300 operating to increase the pressurization of the tank 70a. The other features of the tank and distribution of water from the water delivery system 24a are generally consistent with that as described with regard to water delivery system 24 in FIG. 1.

Since the pressurization occurs within the brew tank 70a the pressure transducer 180 is coupled from the tank to the control system 32. The pressure transducer is coupled over line 182a to the tank 70a instead of the cavity 60 of the funnel 26. Other than these few components, the remainder of the description herein for brewing system 20 applies equally to brewing system 320.

In illustrative embodiments, the brewing system 20 provides a controllably sealable funnel for retaining a charge of brewing substance 46 for purposes of brewing. The funnel is sealed at the upper flange 124 by the inflatable seal member 122 during the brewing process. This seal engagement helps facilitate controllably increasing the pressure within the cavity to help enhance the brewing process. While a seal is formed around the annular trough 200 around the outer perimeter of the bottom 202 of the wall 154, the central area or floor 156 provides a series of passages through which brewed beverage can flow. Additionally, the drain opening 64 allows for the dispensing of brewed beverage therethrough. The system monitors the pressure drop during the brewing process and can be monitored continuously or at various intervals along the process. If the system detects an undesirable pressure increase it can terminate operation of the brew cycle by turning off the pumps and water supply. Similarly, if a lower pressure range is not detected it can also turn off these systems to prevent operation of the brew cycle outside of predetermined operating parameters. Once the system is locked out it can signal the operator using the display 148 to take further action and provide instructions as to what action might be recommended to correct the event that caused the lock out.

In illustrative embodiments, the present system 20 provides familiarity but also improves the speed and control of the brewing characteristics. The pressurization forces water into the cells of the brewing substance particles and improves the extraction of the available solids. The receiving container can be as small as an individual serving or as large as a multi-serving carafe server or dispenser. In contrast to some other brewers, the present system provides a pressurized system which can closely and accurately monitor the pressurization of the funnel in a sealed condition. Reference to "sealed" does not meant that it is actually completely sealed. Rather, it is sealed with regard to the upper portion of the funnel relative to the rest of the machine. The pressure transducer or other similar pressure detecting system monitors the change in pressure and once it falls outside of the operating perimeters that can detect that the coffee has effectively been drained from the grounds. While the brewing substance will remain somewhat damp, the removal of substantially most of the liquid beverage therefrom results in a relatively rapid change in pressure. This rapid change in pressure will indicate that the system should be shut off and the brew cycle has ended.

In illustrative embodiments, the disclosed system does not provide for any special controls on the funnel outlet. In contrast, the outlet drain is generally continuously open eliminating one more complexity of the system. While the system provides for a pressure transducer it does not require any additional special photo electric or acoustic sensors in or proximate the funnel. This also reduces the complexity of the system and eliminates the need to provide special funnels and knowledge as to how those funnels need to be handled or operated. As such the present disclosure improves the efficiency and accuracy of the system.

What is claimed is:

1. A beverage brewing system comprising:
a water delivery system;
a cover coupled to the water delivery system;
a funnel configured to hold a beverage brewing substance in an internal cavity of the funnel, the funnel positionable relative to the cover between a dismounted position to receive the beverage brewing substance and a mounted position to receive water dispensed by the water delivery system through the cover for mixing with the beverage brewing substance to form a brewed beverage, the funnel defining an upper opening extending into the internal cavity;
a pressurization system coupled to the cover; and
a seal member coupled to the cover, the seal member selectively movable toward the funnel while the funnel is in the mounted position to engage with the funnel and form a seal around the upper opening of the funnel for pressurization of the internal cavity by the pressurization system.

2. The system of claim 1, wherein the seal member is inflatable and configured to move between an inflated position engaged with the funnel and a deflated position spaced apart from the funnel.

3. The system of claim 1, wherein the cover includes the seal member and a spray head, and wherein the spray head is configured to disperse water received from the water delivery system into the internal cavity of the funnel.

4. The system of claim 1, wherein the funnel includes a carrier and an insert received in the carrier, and wherein the insert includes a support base, a sidewall extending from the support base, and a flange extending from the sidewall.

5. The system of claim 4, wherein the seal member is engagable with the flange of the insert.

6. The system of claim 4, further comprising a filter positioned on the support base of the insert, and wherein the support base is formed to include a patterned, foraminous floor configured to support the filter and allow liquid to pass through the insert.

7. The system of claim 6, wherein the insert is further formed to include an annular trough surrounding the floor and configured to receive a portion of the filter to seal the filter against the insert.

8. The system of claim 1, wherein the seal member includes a pump ring coupled to the pressurization system and a gasket coupled to the pump ring, the gasket configured to move between an inflated position engaged with the funnel and a deflated position spaced apart from the funnel.

9. The system of claim 8, wherein the cover includes a receiver configured to receive the seal member and a lock plate configured to engage with the receiver to hold the seal member on the receiver.

10. A beverage brewing system comprising:
a water delivery system;
a cover coupled to the water delivery system;
a funnel configured to hold a beverage brewing substance in an internal cavity of the funnel, the funnel positionable relative to the cover to receive water dispensed by the water delivery system through the cover, the funnel defining an upper opening extending into the internal cavity;
a pressurization system coupled to the cover; and
a seal member coupled to the cover, the seal member selectively engagable with the funnel to seal around the upper opening of the funnel for pressurization of the internal cavity by the pressurization system,
wherein the cover includes the seal member and a spray head, the spray head is configured to disperse water received from the water delivery system into the internal cavity of the funnel, the seal member includes a pump ring coupled to the pressurization system and a gasket coupled to the pump ring, and the gasket is configured to move between an expanded position engaged with the funnel and a retracted position spaced apart from the funnel.

11. The system of claim 10, wherein the seal member is inflatable and configured to move between an inflated position engaged with the funnel and a deflated position spaced apart from the funnel.

12. The system of claim 10, wherein the funnel includes a carrier and an insert received in the carrier, and wherein the insert includes a support base, a sidewall extending from the support base, and a flange extending from the sidewall.

13. The system of claim 12, wherein the seal member is engagable with the flange of the insert.

14. The system of claim 12, further comprising a filter positioned on the support base of the insert, and wherein the support base is formed to include a patterned, foraminous floor configured to support the filter and allow liquid to pass through the insert.

15. The system of claim 14, wherein the insert is further formed to include an annular trough surrounding the floor and configured to receive a portion of the filter to seal the filter against the insert.

16. The system of claim 10, wherein the cover is formed to define a receiver configured to receive the seal member and a lock plate configured to engage with the receiver to hold the seal member on the receiver.

* * * * *